(12) United States Patent
Feng et al.

(10) Patent No.: US 9,339,807 B2
(45) Date of Patent: May 17, 2016

(54) DEVICE FOR MAKING CARBON NANOTUBE FILM

(71) Applicants: Chen Feng, Beijing (CN); Kai-Li Jiang, Beijing (CN); Zhuo Chen, Beijing (CN); Yong-Chao Zhai, Beijing (CN); Shou-Shan Fan, Beijing (CN)

(72) Inventors: Chen Feng, Beijing (CN); Kai-Li Jiang, Beijing (CN); Zhuo Chen, Beijing (CN); Yong-Chao Zhai, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 313 days.

(21) Appl. No.: 13/687,350

(22) Filed: Nov. 28, 2012

(65) Prior Publication Data

US 2013/0089694 A1    Apr. 11, 2013

Related U.S. Application Data

(62) Division of application No. 12/565,890, filed on Sep. 24, 2009, now Pat. No. 8,343,451.

(30) Foreign Application Priority Data

Jun. 2, 2009  (CN) .......................... 2009 1 0107590

(51) Int. Cl.
*B01J 35/02*    (2006.01)
*B82Y 30/00*    (2011.01)
(Continued)

(52) U.S. Cl.
CPC    *B01J 35/02* (2013.01); *B01J 32/00* (2013.01); *B82Y 30/00* (2013.01); *B82Y 40/00* (2013.01); *C01B 31/0226* (2013.01); *Y10T 428/12424* (2015.01); *Y10T 428/21* (2015.01); *Y10T 428/24471* (2015.01); *Y10T 428/2918* (2015.01)

(58) Field of Classification Search
CPC .............. C01B 31/022; C01B 31/0226; C01B 31/0233; C01B 31/024; C01B 31/0246; C01B 31/0253; C01B 31/026; C01B 31/0266; C01B 31/0273; C01B 31/028; C01B 31/0286; C01B 31/0293
USPC .................................. 977/742–754, 842–848; 423/447.1–447.3, 445 B
See application file for complete search history.

(56) References Cited

U.S. PATENT DOCUMENTS 5,098,856 A  *  3/1992  Beyer et al. .................... 438/422
5,534,294 A  *  7/1996  Kubota et al. ................. 438/476
(Continued)

FOREIGN PATENT DOCUMENTS

JP    2004-102217    4/2004
JP    2008-544939    12/2008

OTHER PUBLICATIONS

Teo, et al., Uniform patterned growth of carbon nanotubes without surface carbon, Appl. Phys. Lett. 2001; 1534-1536.*
(Continued)

*Primary Examiner* — Daniel C McCracken
(74) *Attorney, Agent, or Firm* — Novak Druce Connolly Bove + Quigg LLP

(57) ABSTRACT

A device for making a carbon nanotube film includes a substrate having a surface, and two substantially parallel slits defined on the surface of the substrate. The two substantially parallel slits extend into the substrate from the surface of the substrate. A growing surface is defined by the two substantially parallel slits and located between the two substantially parallel slits.

6 Claims, 7 Drawing Sheets

(51) Int. Cl.
    *B82Y 40/00*  (2011.01)
    *C01B 31/02*  (2006.01)
    *B01J 32/00*  (2006.01)

(56) References Cited

U.S. PATENT DOCUMENTS

| | | | |
|---|---|---|---|
| 5,679,212 A * | 10/1997 | Kato et al. | 438/692 |
| 6,232,706 B1 | 5/2001 | Dai et al. | |
| 6,831,017 B1 | 12/2004 | Li et al. | |
| 2004/0047038 A1 | 3/2004 | Jiang et al. | |
| 2004/0053780 A1 * | 3/2004 | Jiang et al. | 502/182 |
| 2007/0092431 A1 | 4/2007 | Resasco et al. | |
| 2007/0237959 A1 * | 10/2007 | Lemaire | 428/408 |
| 2008/0018012 A1 | 1/2008 | Lemaire et al. | |
| 2008/0170982 A1 * | 7/2008 | Zhang | B82Y 10/00 423/447.3 |
| 2009/0248235 A1 * | 10/2009 | Hering et al. | 701/31 |
| 2010/0294352 A1 * | 11/2010 | Srinivasan et al. | 136/256 |

OTHER PUBLICATIONS

K.B.K. Teo et al. "Uniform patterned growth of carbon nanotubes without surface carbon." Applied Physics Letters, vol. 79, No. 10. Sep. 3, 2001, pp. 1534-1536,fig1(c) and fig4.

* cited by examiner

DEVICE FOR MAKING CARBON NANOTUBE FILM

CROSS-REFERENCE TO RELATED APPLICATIONS

This application is a divisional of U.S. patent application Ser. No. 12/565,890, filed on Sep. 24, 2009 entitled, "DEVICE AND METHOD FOR MAKING CARBON NANOTUBE FILM." The disclosures of the above-identified applications are incorporated herein by reference.

BACKGROUND

1. Technical Field

The present disclosure relates to devices for making carbon nanotube structures and, particularly, to a device for making a carbon nanotube film.

2. Description of Related Art

Carbon nanotubes are novel carbonaceous material and have received a great deal of interest since the early 1990s. The carbon nanotubes are electrically conductive along their length, chemically stable, and each can have a very small diameter (much less than 100 nanometers) and large aspect ratios (length/diameter). Due to these and other properties, carbon nanotubes have become a significant focus of research and development for use in electron emitting devices, sensors, transistors, and other devices.

Generally, the carbon nanotubes prepared by conventional methods are in particle or powder forms. The particle or powder-shaped carbon nanotubes limit the applications. Thus, preparation of macro-scale carbon nanotube structures, such as carbon nanotube films, has attracted attention.

A conventional method for making a carbon nanotube film includes providing a growing substrate, forming a catalyst layer on the growing substrate, providing a reacting furnace, placing the growing substrate with the catalyst layer into the reacting furnace, and introducing a carbonaceous gas and heating the reacting furnace to grow the carbon nanotube film. However, the carbon nanotube film made by the above-described method is formed on the growing substrate and does not have a free-standing structure. Further, the carbon nanotubes in the carbon nanotube film are entangled with each other and disorderly distributed in the carbon nanotube film. Thus, the excellent properties of the carbon nanotubes are poorly utilized.

In order to solve the above problems, a method for making a nanofiber film is taught by US 2008/0170982 A to Baughman et al. The method includes arranging nanofibers to provide a substantially parallel nanofiber array having a degree of inter-fiber connectivity within the nanofiber array, and drawing said nanofibers from the nanofiber array as a ribbon or sheet without substantially twisting the ribbon or sheet. The nanofiber array has a columnar shape and can be a carbon nanotube array.

When the nanofibers are drawn from the nanofiber array to form the ribbon or sheet, the width of the nanofiber ribbon or sheet is substantially equal to the width of the drawn nanofibers. However, the width of the drawn nanofibers is inevitably affected by the columnar nanofiber array. Thus, the nanofiber ribbon or sheet cannot have a uniform width, so it is not entirely suitable for industrial applications.

What is needed, therefore, is a device for making a carbon nanotube film of uniform width.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
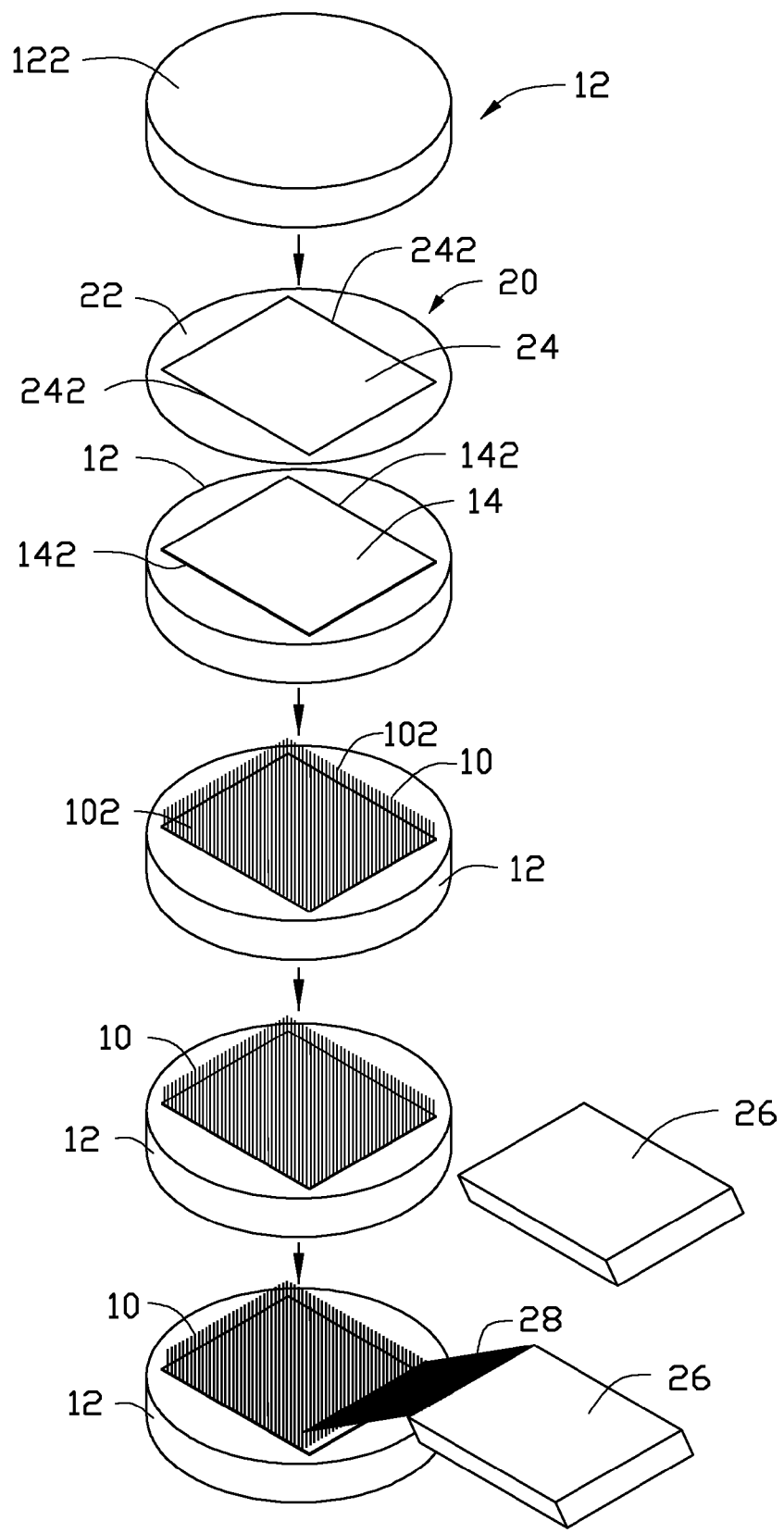
FIG. 1 is a schematic view of a method for making a carbon nanotube film in accordance with a first embodiment, wherein a substrate is provided.
Figure 2:
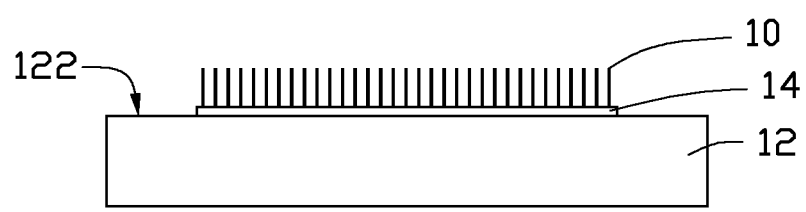
FIG. 2 is a schematic side view of the substrate in FIG. 1, wherein a carbon nanotube array grows from the substrate in FIG. 1.
Figure 3:
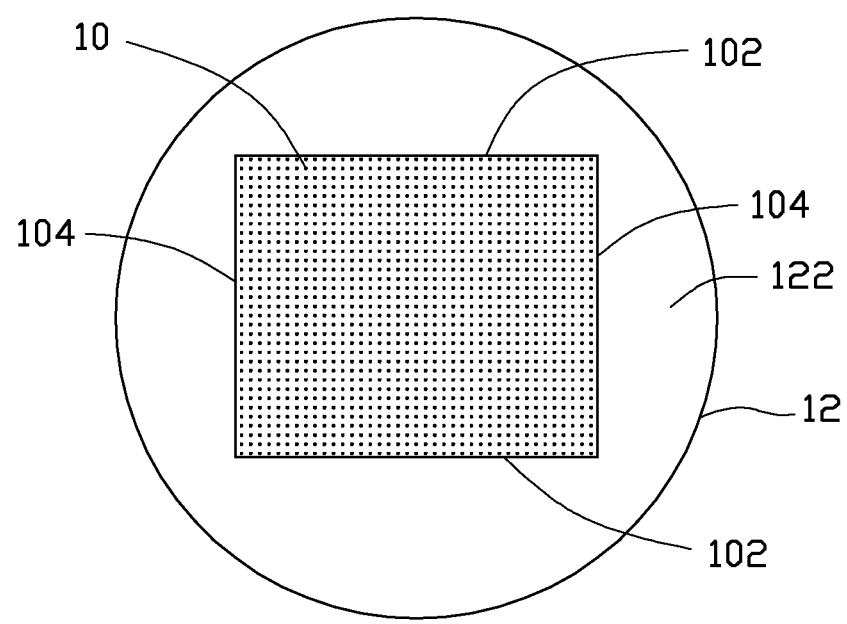
FIG. 3 is a top plan view of the substrate with the carbon nanotube array grown thereon in FIG. 2.
Figure 4:
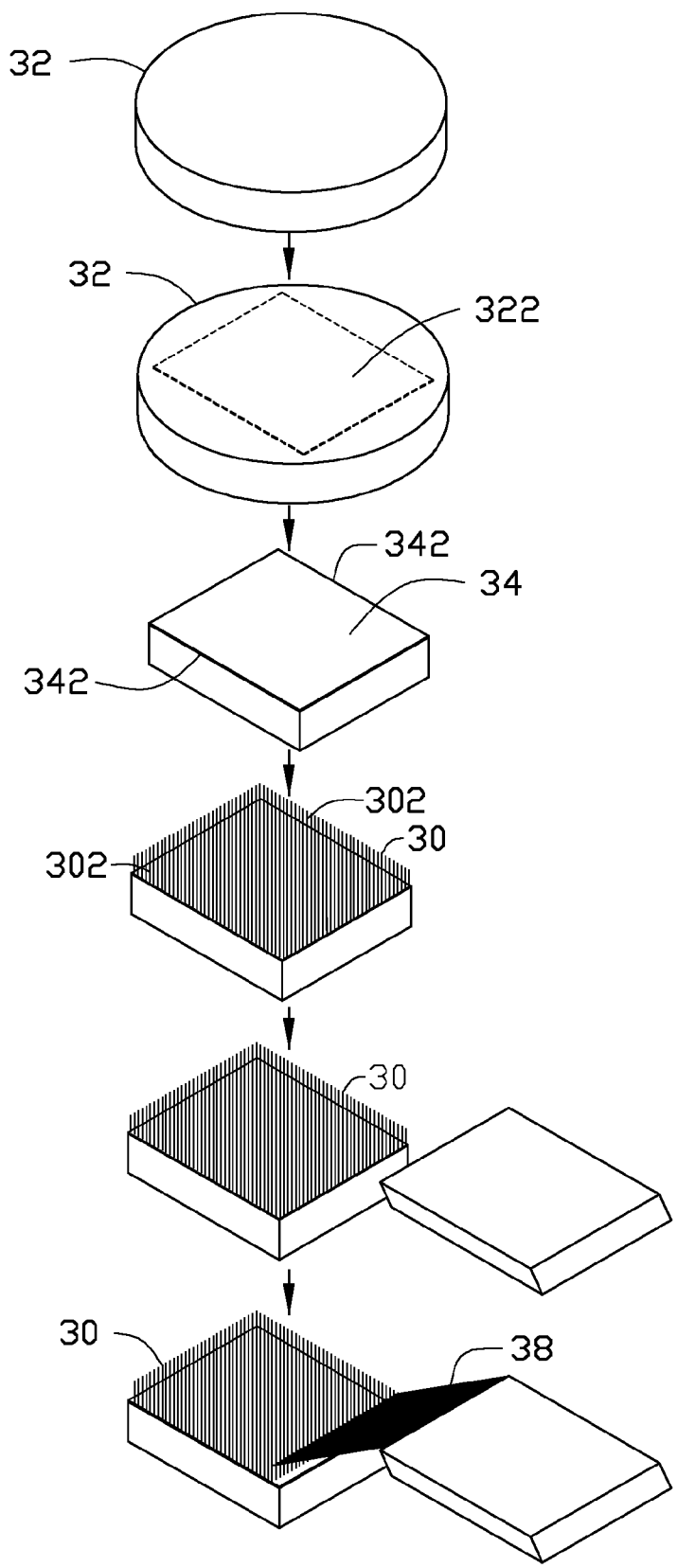
FIG. 4 is a schematic view of a method for making a carbon nanotube film in accordance with a second embodiment, wherein a substrate is provided.

Referring to FIG. 1 to FIG. 3, a method and device for making a carbon nanotube film in accordance with the first embodiment are provided. The method includes:

(a) providing a substrate 12 having a surface 122;

(b) forming a catalyst layer 14 on the surface 122 of the substrate 12, the catalyst layer 14 having two substantially parallel sides 142;

(c) annealing the catalyst layer 14 in air at a high temperature;

(d) heating the annealed catalyst layer 14 up to a predetermined reaction temperature in a furnace with a protective gas therein, and supplying a carbonaceous gas in the furnace to grow a carbon nanotube array 10 from the substrate 12, the carbon nanotube array 10 having two substantially parallel side faces 102; and (e) drawing a carbon nanotube film 28 from the carbon nanotube array 10 along a drawing direction, and the drawing direction being substantially parallel to the two substantially parallel side faces 102 of the carbon nanotube array 10.

In step (a), the substrate 12 is a smooth, flat, and circular substrate. A material of the substrate 12 can be glass, quartz, silicon, or aluminum oxide. In one embodiment, the substrate 12 is a 4 inch diameter silicon substrate.

Step (b) can be executed by a substrate-treating method or a catalyst-treating method. The substrate-treating method includes forming a growing surface on the surface 122 of the substrate 12 by treating the surface 122, wherein the growing surface has two substantially parallel sides; and forming the catalyst layer 14 on the growing surface of the substrate 12. The catalyst-treating method can be executed by a template method or an etching method. The etching method includes forming a pre-catalyst layer on the surface 122 of the substrate 12; and acquiring the catalyst layer 14 having two substantially parallel sides by treating the pre-catalyst layer.

In one embodiment, step (b) is executed by the template method. The template method includes:

(b1) providing a mask 20, the mask 20 defining a hollow area 24, and the hollow area 24 having two substantially parallel sides 242;

(b2) putting a spacer between the mask 20 and the substrate 12 to attach the mask 20 to the substrate 12;

(b3) forming the catalyst layer 14 on the substrate 12 corresponding to the hollow area 24; and (b4) removing the mask 20.

In step (b1), the mask 20 includes a covering area 22 and the hollow area 24 defined by the covering area 22. A size of the hollow area 24 is less than a size of the surface 122 of the substrate 12. The material of the mask 20 can be varied to ensure that the mask 20 will not be deformed during the following processes. The material of the mask 20 can be metal. In one embodiment, the material of the mask 20 is iron, and the shape of the hollow area 24 is substantially rectangular.

In step (b2), the hollow area 24 is located on the substrate 12 to ensure material of the catalyst layer 14 can completely fall onto the substrate 12. The material of the catalyst layer 14 can be iron, cobalt, nickel and an alloy thereof. A thickness of the spacer can be larger than 0.1 millimeters and less than or equal to 100 millimeters. Specifically, the thickness of the spacer can be more than 0.1 millimeters and less than or equal to 10 millimeters. In one embodiment, the material of the catalyst layer 14 is iron, and the thickness of the spacer is about 2 millimeters.

In step (b3), the catalyst layer 14 is formed on the surface 122 of the substrate 12 corresponding to the hollow area 24. The catalyst layer 14 has a same shape as that of the hollow area 24. That is, the catalyst layer 14 has two substantially parallel sides 142 corresponding to the substantially parallel sides 242 of the hollow area 24. A thickness of the catalyst layer 14 can be in a range from about 2 nanometers to about 9 nanometers. A method for forming the catalyst layer 14 can be by an evaporation deposition method, a thermal deposition method, an electron-beam deposition method, and a sputtering method. In one embodiment, the catalyst layer 14 is substantially rectangular, the thickness of the catalyst layer 14 is from about 3 nanometers to about 6 nanometers, and the catalyst layer 14 is formed by the evaporation deposition method.

It can be understood that the shape of the hollow area 24 also can be any other shape having two substantially parallel sides, for example, a "U" shape.

In step (c), the catalyst layer 14 is annealed for a time ranging from about 30 minutes to about 90 minutes. The catalyst layer 14 is oxygenated to form a plurality of nanometer-scale catalyst particles, and a scope of the diameter of the catalyst particles is narrow.

In step (d), the predetermined reaction temperature can be about 700° C. to about 1000° C. The carbon nanotube array 10 has a top surface substantially parallel to the surface 122 of the substrate 12. The top surface has two substantially parallel sides being in alignment with the two substantially parallel sides 142 of the catalyst layer 14. The carbon nanotube array 10 has a certain height, such that the two substantially parallel side faces 102 are in alignment with the two substantially parallel sides 142 of the catalyst layer 14. The protective gas can be an inert gas selected from helium, neon, argon, krypton, and xenon. The carbonaceous gas can be a hydrocarbon gas, such as ethylene ($C_2H_4$), methane ($CH_4$), acetylene ($C_2H_2$), ethane ($C_2H_6$), or any combination thereof. In one embodiment, the protective gas is argon and $C_2H_4$ is supplied into the furnace for about 5 minutes to about 30 minutes. The carbon nanotube array 10 is obtained with a height of about 200 micrometers to about 400 micrometers.

The carbon nanotube array 10 includes a plurality of carbon nanotubes substantially parallel to each other and approximately perpendicular to the substrate 12. The plurality of carbon nanotubes may be single-wall carbon nanotubes, double-wall carbon nanotubes, multiwall carbon nanotubes, or a combination thereof. The carbon nanotube array 10 formed under the above conditions is essentially free of impurities, such as carbonaceous or residual catalyst particles. In one embodiment, the two substantially parallel side faces 102 are opposite to each other, and the carbon nanotube array 10 has another pair of opposite and substantially parallel side faces 104.

Step (e) includes:

(e1) providing a drawing tool 26;

(e2) forming a contact surface by contacting the drawing tool 26 with the carbon nanotube array 10; and (e3) forming the carbon nanotube film 28 by stretching the contact surface using the drawing tool 26 along the drawing direction.

In step (e1), a length of the drawing tool 26 is longer than or equal to a distance between the two substantially parallel side faces 102. In one embodiment, the drawing tool 26 is an adhesive tape, and the length of the adhesive tape is longer than or equal to the distance between the two substantially parallel side faces 102. In step (e2), the contact surface is connected with and approximately perpendicular to the two substantially parallel side faces 102. In step (e3), an angle is defined between the drawing direction and the substrate 12. The angle can be in a range from about 0 degrees to about 30 degrees. In one embodiment, the angle is in a range from about 0 degrees to about 5 degrees. Specifically, the angle is about 5 degrees.

More specifically, during the drawing process, as the initial carbon nanotubes are stretched out, other carbon nanotubes are also stretched out end to end, due to the van der Waals attractive force between ends of adjacent carbon nanotubes. The carbon nanotubes in the carbon nanotube film 26 are approximately parallel to the drawing direction of the carbon nanotube film 26. The width of the carbon nanotube film 28 is determined by the shape of carbon nanotube array 10. The width of the carbon nanotube film 28 is determined by the distance between the two substantially parallel side faces 102, and the distance between the two substantially parallel side faces 102 is approximately uniform; so the carbon nanotube film 28 is consecutive, has a uniform width, and a regular shape. The length of the carbon nanotube film 28 is unrestricted, and can be determined according to practical need.

The device for making the carbon nanotube film 28 includes the substrate 12 and the catalyst layer 14 having two substantially parallel sides 142. The catalyst layer 14 is on the substrate 12.

Referring to FIG. 4 to FIG. 7, are the second embodiments of a method and a device for making the carbon nanotube film. The method includes:

(a11) providing a substrate 32 having a surface 322;

(b11) forming a catalyst layer 34 on the surface 322 of the substrate 32, and the catalyst layer 34 having two substantially parallel sides 342;

(e11) annealing the catalyst layer 34 on the substrate 32 in air at a high temperature;

(d11) heating the annealed catalyst layer 34 on the substrate 32 up to a predetermined reaction temperature in a furnace with a protective gas therein, and supplying a carbonaceous gas in the furnace to grow a carbon nanotube array 30 from the substrate 32, and the carbon nanotube array 30 having two substantially parallel side faces 302; and (e11) drawing a carbon nanotube film 38 from the carbon nanotube array 30 along a drawing direction, and the drawing direction being substantially parallel to the two substantially parallel side faces 302 of the carbon nanotube array 30.

In the second embodiment, the step (b11) is executed by the substrate-treating method. The substrate-treating method includes: forming a growing surface 320 on the surface 322 by treating the surface 322 and the growing surface 320 having two substantially parallel sides 328; and forming the catalyst layer 34 on the growing surface 320.

Figure 5:
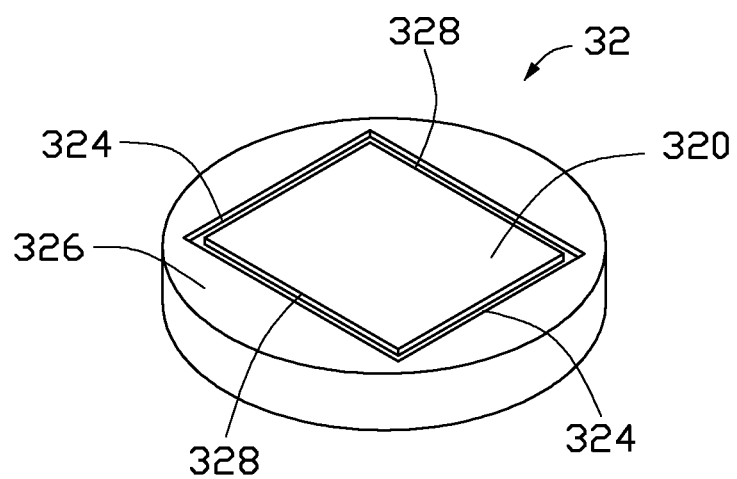
FIGS. 5, 6, and 7 are schematic views of various embodiments of the substrate in FIG. 4 used in the method for making a carbon nanotube film.

The growing surface 320 is formed on the surface 322 via a photoetching method or a laser method. Specifically, at least two substantially parallel slits 324 are formed on the surface 322 of the substrate 32 by the photoetching method or the laser method. The growing surface 320 is located between the at least two substantially parallel slits 324, and the growing face 320 can be separated from a residual surface 326 of the substrate 32 by the slits 324. In FIG. 5, the shape of the substrate 32 has two pairs of parallel slits 324, the growing face 320 is substantially rectangular, and is separated from the residual surface 326 by the two pairs of substantially parallel silts 324.

Figure 6:
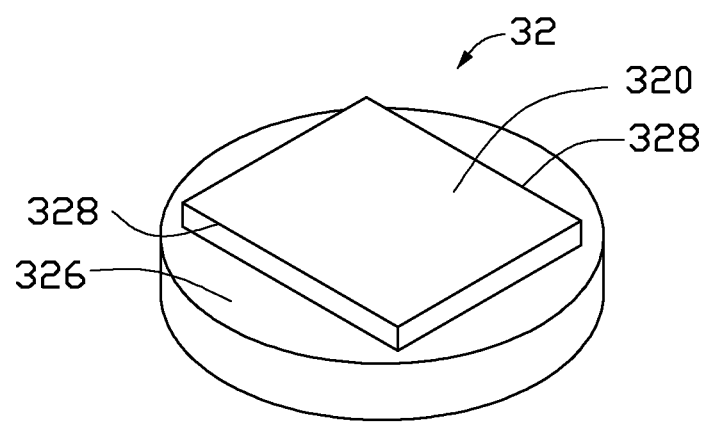

In one embodiment, the residual surface 326 can be partly cut down from the substrate 32 to form the independent growing surface 320, via the photoetching method or the laser method, and the residual surface 326 is thinner than the growing surface 320. In FIG. 6, the residual surface 326 is partly cut down to clearly expose the growing surface 320.

Figure 7:
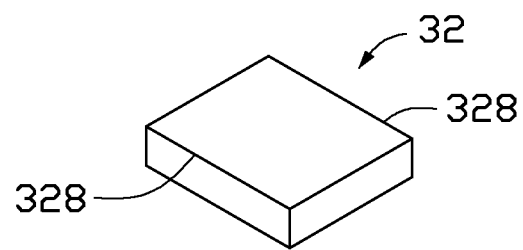

In another embodiment, the residual surface 326 can be completely cut away from the substrate 32, to form the growing surface 320. In FIG. 7, the residual surface 326 is completely cut away, and the substrate 32 is cuboid.

More specifically, in the second embodiment, the growing surface 320 is formed on the surface 322 of the substrate 32 by the laser method. A laser is provided, and the path of the laser beam can be controlled by a computer program. A shape of the substrate 32 is inputted into the computer program, to control the laser beam, in order to form the growing surface 320 on the surface 322. In this embodiment, the laser is directed along a dashed line shown in FIG. 5, and the cuboid shaped substrate 32 is formed, as shown in FIG. 7.

It is to be understood, the process can also be carried out by fixing the laser beam and moving the substrate 32 by a computer program along a predetermined path, to get a cubic substrate 32.

The device for making the carbon nanotube film 38 includes the substrate 32 and the catalyst layer 34 having two substantially parallel sides 342. The catalyst layer 34 is on the substrate 32.

The carbon nanotube array has two substantially parallel side faces. The carbon nanotube film is formed by pulling a plurality of carbon nanotubes along the direction being substantially parallel to the side faces. Thus, the carbon nanotube film has a good uniformity, even width, and orderly shape. Moreover, the device and the method for making the carbon nanotube film are easy and low cost. The carbon nanotube film can be directly applied in industry without any other follow-up process, and the device and method are conducive to large scale production of carbon nanotube film in industry.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A device for making a carbon nanotube film, the device comprising:
    a substrate having a surface, wherein the material of the substrate is glass, quartz, silicon, or aluminum oxide;
    two first slits defined on the surface of the substrate, wherein the two first slits are substantially parallel and extend into the substrate from the surface of the substrate, and the first slits are along a first direction;
    two second slits defined on the surface of the substrate, wherein the two second slits are substantially parallel and extend into the substrate from the surface of the substrate, the two second slits are along a second direction, the two first slits intersects the two second slits and a growing surface is defined and surrounded by the two first slits and the two second slits; and
    a carbon nanotube array located on the growing surface, wherein the carbon nanotube array is configured to have a carbon nanotube film drawn therefrom.

2. The device of claim 1, further comprising a catalyst layer on the growing surface.

3. The device of claim 1, wherein the substrate is a circular substrate.

4. The device of claim 1, wherein a residual surface is located beyond the two first slits and the two second slits, and the growing surface is separated from the residual surface by the two first silts and the two second slits.

5. The device of claim 1, wherein the first direction is perpendicular to the second direction.

6. A device for making a carbon nanotube film, the device comprising:
    a plane substrate having a surface, two first slits spaced with each other, and two second slits spaced with each other, wherein the two first slits and the two second slits extend into the substrate from the surface, the two first slits intersects the two second slits, a growing surface is defined and surrounded by the two first slits and the two second slits, and the material of the substrate is glass, quartz, silicon, or aluminum oxide;
    a catalyst layer located on the growing surface; and
    a carbon nanotube array located on the growing surface, wherein the carbon nanotube array is configured to have a carbon nanotube film drawn therefrom.

* * * * *